United States Patent
Taliaferro

(10) Patent No.: US 7,369,921 B2
(45) Date of Patent: May 6, 2008

(54) POWER DISTRIBUTION EXPERT SYSTEM

(75) Inventor: James Bryan Taliaferro, Toano, VA (US)

(73) Assignee: Northrop Grumman Corporation, Los Angeles, CA (US)

(*) Notice: Subject to any disclaimer, the term of this patent is extended or adjusted under 35 U.S.C. 154(b) by 45 days.

(21) Appl. No.: 11/351,550

(22) Filed: Feb. 10, 2006

(65) Prior Publication Data

US 2007/0191992 A1    Aug. 16, 2007

(51) Int. Cl.
*G05D 11/00* (2006.01)
*G06F 19/00* (2006.01)

(52) U.S. Cl. ............... 700/286; 700/292; 361/59; 307/125; 307/139

(58) Field of Classification Search ........ 700/286, 700/292; 361/93.1, 59; 307/125, 139
See application file for complete search history.

(56) References Cited

U.S. PATENT DOCUMENTS

| | | | |
|---|---|---|---|
| 4,551,631 A | 11/1985 | Trigilio | |
| 4,754,410 A * | 6/1988 | Leech et al. | 706/45 |
| 4,977,390 A | 12/1990 | Saylor et al. | |
| 5,349,644 A | 9/1994 | Massey et al. | |
| 5,594,285 A | 1/1997 | Wisbey et al. | |
| 5,629,862 A | 5/1997 | Brandwajn et al. | |
| 5,936,318 A | 8/1999 | Weiler et al. | |
| 6,347,027 B1 * | 2/2002 | Nelson et al. | 361/64 |
| 6,459,175 B1 | 10/2002 | Potega | |
| 6,633,802 B2 | 10/2003 | Sodoski et al. | |
| 6,856,045 B1 | 2/2005 | Beneditz et al. | |
| 6,892,115 B2 | 5/2005 | Berkcan et al. | |
| 6,921,987 B2 | 7/2005 | Marin-Martinod | |
| 2003/0023885 A1 | 1/2003 | Potter et al. | |
| 2003/0043757 A1 * | 3/2003 | White | 370/254 |
| 2004/0254688 A1 | 12/2004 | Chassin et al. | |
| 2005/0038571 A1 | 2/2005 | Brickfield et al. | |
| 2005/0177766 A1 * | 8/2005 | Lee et al. | 714/11 |
| 2006/0015830 A1 * | 1/2006 | Schwarzmann | 716/2 |
| 2007/0052705 A1 * | 3/2007 | Oliveira et al. | 345/423 |

OTHER PUBLICATIONS

"General rules of electrical installation design—Chapter A", Schneider Electric, Electrical Installation Guide 2007.*
"Transitions"; Northrop Grumman Newport News, Dec. 14, 2005, 15 pgs.
"Transitions Manager (TM) Requirements" Northrop Grumman Newport News, Dec. 14, 2005, pp. 1-10.
"Optimization of QoS Traffic with a Number of Constraints in DiffServ/MPLS Networks"; Alex Chpenst & Tommy Curran, Dublin City University, 6 pgs.

(Continued)

*Primary Examiner*—Michael D. Masinick
(74) *Attorney, Agent, or Firm*—Hunton & Williams

(57) ABSTRACT

A power distribution expert system is provided to determine an optimal power distribution configuration, and also to determine an optimal transition path to reach said optimal configuration. An exemplary first set of rules is provided to determine an optimal power distribution configuration. An exemplary second set of rules is provided to determine an optimum transition path to achieve the optimal power distribution configuration.

22 Claims, 4 Drawing Sheets

Network representation of a Medium Voltage Distribution System

OTHER PUBLICATIONS

"10.2 Dijkstra's Algorithm"; *Data Structures and Algorithms,* from internet Dec. 12, 2005, 3 pgs.

"10 Graphs"; *Data Structures and Algorithms,* from internet Dec. 12, 2005; 4 pgs.

"Introductory Definitions for Optimal Path Problems"; Version: Draft -1.0; last updated Sep. 1995; from internet Dec. 12, 2005; 2 pgs.

"Java Applet Demos of Dijkstra's Algorithm" from internet Dec. 12, 2005, 1 pg.

"K-th Shortest Path Problem"; Version Draft 1.0; last updated Dec. 1995; from internet Dec. 12, 2005; 4 pgs.

"Extracting Optimal Paths from Roadmaps for Motion Planning"; J.Kim, et al; Dept. of Computer Science, Texas A&M University; 6 pgs.

"Shortest Path Problem"; Dijkstra's Algorithm; from internet Dec. 12, 2005; 1 pg.

"Juran on Quality by Design, The New Steps for Planning Quality into Goods and Services"; J.M. Juran; Juran Institute, Inc., 1992; pp. 406-427 & 462-467.

"Artificial Intelligence (Understanding Computers)"; Time-Life Books, 1986, pp. 36-43.

* cited by examiner

Bit Representation of Medium Voltage Distribution System

Network representation of a Medium Voltage Distribution System

Lineup States of the Medium Voltage Distribution System in Normal Operation

Medium Voltage Distribution System Architecture

POWER DISTRIBUTION EXPERT SYSTEM

FIELD OF THE INVENTION

The present invention relates generally to power distribution expert systems. In particular, the present invention relates to: a) determining a need to possibly change a power distribution configuration; b) determining an optimal power distribution configuration; c) determining an optimal transition path to reach said optimal power distribution configuration; and d) implementing said optimal transition path to reach said optimal power distribution configuration.

BACKGROUND

An expert system makes decisions or solves problems in a particular field by using knowledge and analytical rules. For one early example, Cambell Soup Company created over 150 rules to run the complex soup sterilizers that kill bacterial in canned soup. See Artificial Intelligence, by Time-Life Books, 1986, pages 36-43. It took approximately 14 man-months to define these over 150 rules.

Additionally, design optimization is often performed using multiple criteria optimization, also known as objective function optimization. For one early example, the very successful Ford Taurus™ was designed by optimizing over 400 criteria that directly affected the senses of the user. See Juran on Quality by Design, 1992, page 465.

There are at least 3 distinct aspects to design optimization. The first aspect is to create or discover or define a set of criteria (factors) that are of interest. The second aspect is to assign an objective value or cost (or constraining limits) to each criterion. The third aspect is to search for the optimum design (maximize value or minimize cost). None of these aspects are trivial. For example, an objective function defining the quality of a car might simultaneously consider gas mileage, and engine power. These two factors (mileage and power) interact in complex and non-linear ways.

Power distribution systems are complex systems in many respects: multiple sources of power, multiple power consuming devices, and multiple power paths to distribute power from one specific power source to a specific power consuming device.

Another source of complexity is caused by sources of power and consumers of power that change over time. For example, one source of power may stop producing power (a generator may be hit by a missile), or one power consuming device may stop consuming power (a radar may be turned off). Similarly, sources and consumers may be added to the system.

Even after an optimal power distribution configuration is determined, a third source of complexity is determining an optimal transition path to travel in order to reach the optimal configuration. These optimizations (optimal configuration and optimal transition path) are multiple criteria optimizations, and thus require sets of rules to define an objective criteria function that must be optimized (either maximized or minimized, depending upon the form of the function). The objective criteria function is generally treated as a cost function and minimized. The cost of transiting from a first state A to a second state B might not equal the cost of transiting in the reverse direction. In other words, the transition costs between two states may depend on the direction of the transition.

Additionally, directly transitioning from a non-optimal configuration to an optimal configuration (without any intermediate configurations) is often not possible. Further, even if a direct transition is possible, the direct transition may not be the optimal transition path.

Some power distribution systems are very time sensitive. For example, if power to a defensive radar on a military ship is lost for a few seconds, then the ship may be destroyed by a missile. A heart pump in a hospital may have similar time sensitive needs.

Thus, there is a need for a expert power distribution system that determines an optimal power distribution configuration, and determines an optimal transition path to reach said optimal power configuration.

The following patents and patent publications describe the state of the art: U.S. Pat. No. 5,349,644 by Massey et al., U.S. Pat. No. 5,629,862 by Brandwain et al., U.S. Pat. No. 5,936,318 by Weiler et al., U.S. Pat. No. 6,459,175 by Potega, U.S. Pat. No. 6,633,802 by Sodeski et. al., U.S. Pat. No. 6,921,987 by Marin-Martinod, U.S. Patent Application Publication 2003/0023885 by Potter, U.S. Patent Application Publication 2004/0254688 by Chassin, and U.S. Patent Application Publication 2005/0038571 by Brickfield.

SUMMARY OF THE INVENTION

In a first illustrative embodiment, a power distribution expert system (PDES) may configure a power distribution configuration by performing the following steps: determining an optimal configuration by using optimal configuration rules; determining an optimal transition path to transition from a present configuration to said optimal configuration by using optimal transition path rules; and implementing said optimal transition path to reach said optimal configuration.

This and other aspects will become apparent from the following description of the preferred embodiment taken in conjunction with the following drawings, although variations and modifications may be effected without departing from the spirit and scope of the novel concepts of the disclosure.

BRIEF DESCRIPTION OF THE DRAWINGS

The present invention can be more fully understood by reading the following detailed description together with the accompanying drawings, in which like reference indicators are used to designate like elements.

DETAILED DESCRIPTION OF THE INVENTION

Figure 1:
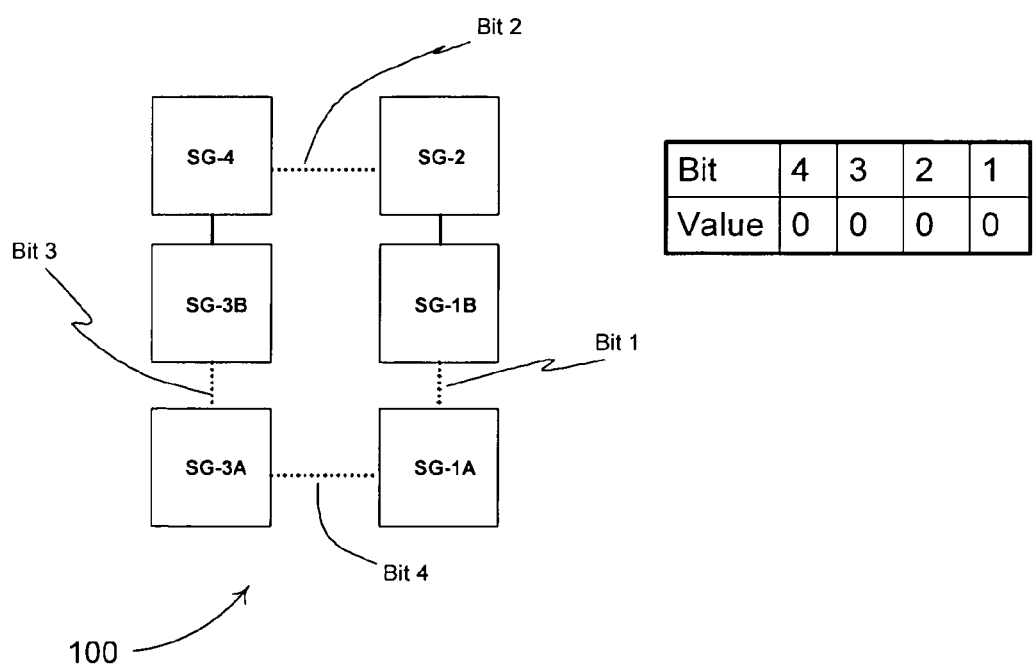
FIG. 1 displays a Bit Representation of a Medium Voltage System.

Hereinafter, various embodiments of the invention will be described. As used herein, any term in the singular may be interpreted in the plural, and alternately, any term in the plural may be interpreted to be in the singular. Similarly, process steps may be omitted or rearranged.

In some embodiments, an expert system according to the invention may be used to optimize an electrical distribution system if generation components unexpectedly drop out. For example, if an incident results in the destruction of two of four electrical generators in a distribution system, then the expert system determines how the remaining electrical power should be allocated and distributed. The expert system of the invention can also be used to determine how a power distribution system should be configured during various modes of operation (e.g., safe mode or fully operational mode) and how the power distribution should be configured during transition from one mode to another.

The expert system of the invention may also comprise a path optimization system. As is known in the art, path optimization may be defined as a "single-source shortest path problem" ("K-th shortest path problem" or "minimal spanning trees"). In such a system, a finite set of nodes and arcs are defined. Each node represents a state, and the arcs are valid transition paths between the states. A cost is assigned to each arc. The system may be analyzed to determine efficient transition paths. The paths may be bidirectional. The paths may have different costs associated with different directions. Many other path optimization search procedures are known in the art.

A typical power generation system to which the expert system may be applied may have a plurality of power sources, loads and switchboards. Of particular interest are systems sized and configured for shipboard use. The transition costs used for the optimization may depend upon such factors as: time to effect the transition, the number of breaker closings required to effect a transition, and the number of breaker openings required to effect a transition. The generation system may also have physical constraints such as space limitations affecting the maximum number of breakers allowed. The terms "breaker" and "circuit breaker" are hereby expressly defined as any electrical device capable of electrically connecting two nodes (also known as short circuiting), or capable of electrically disconnecting two nodes (also known as open circuiting). Exemplary circuit breaker devices include: a device that automatically open circuits if some threshold current is exceeded, an automatic bus transfer, an auctioneer, a switch, a silicon control relay (SCR), a solenoid controlled relay, and a mechanical knife blade switch.

In some embodiments, the expert system may have approximately 40 specific rules, approximately half directed to defining an optimal power distribution configuration and approximately half directed to defining an optimal transition path from the present power distribution configuration to the optimal power distribution configuration. The present power distribution configuration is termed "the present state", and a potential power distribution configuration which is being evaluated is termed "the target state." Thus, many target states may have to be evaluated to determine the optimal power distribution configuration.

About 20 of the rules define the optimal power distribution configuration. In other words, these rules define a cost (an objective criteria cost function) for any power distribution configuration. The expert system may evaluate the cost of very possible state to determine which state has the least cost. In a complex system with many potential states, some optimization search techniques may be utilized to avoid evaluating all possible states. See Table 1 below titled "Power Distribution Configuration Costs (State Rules)" for exemplary factors.

For example, Rule 4 in Table 1 asserts that if the target state connects unpowered switchboards, then the weight or cost is infinite (not allowed). An infinite cost means that the targeted state is not allowed. Rule 5 asserts that if the targeted state contains an unpowered switchboard that is not connected to another unpowered switchboard, then relative weight or cost is 100,000 because these states are recognized to allow for startup and casualty situations. Rule 19 asserts that if the targeted state has more rated load than power generation capacity in a power center, and the ship is in a heightened readiness condition, then the relative weight or cost is 100 because it is preferable to align the plan with the load ratings anticipating that the loads will increase above present levels.

Additionally, about 20 rules may relate to defining an optimal transition path from a present state to a target state. In other words, these rules define a cost (an objective criteria cost function) for any path between a present state and a target state. Usually this path will traverse intermediate states. See Table 2 below titled "Power Distribution Transition Costs (Transition Rules)" for exemplary factors.

For example, Rule 7 in Table 2 asserts that removing a power source that is in the target state has a relative weight or cost of 10,000 because it is not desirable to add and secure a power source only to aid a transition. Rule 13 asserts that reducing the number of power centers when the ship is in a heightened readiness has a relative weight or cost of 100 because fewer power centers reduce the power redundancy of the system.

FIG. 1 displays a Bit Representation of a Medium Voltage Distribution System. In some exemplary embodiments, a medium voltage system lineup operation may be characterized by power centers. The power center is an isolated, or islanded, set of power sources and connected loads. The isolation is effected by opening the circuit breakers between the medium voltage switchboard buses. The power center concept allows one to quickly evaluate the redundancy and efficiency of a lineup. More power centers tend to insulate the system from cascading faults and provide power system redundancy for loads with multiple feeds. Fewer power centers provide opportunity to lump loads under fewer power sources and to operate fewer generators at more efficient loading levels. The power manager is responsible for commanding the power center configuration and transitioning between lineups. A single power center is represented by a medium voltage switchboard bus, also known as a switchboard.

An exemplary medium voltage distribution system, comprises four main switchboards. Note that SG-4 and SG-3B are permanently connected (by a solid connecting line) and are treated as a single main switchboard. Similarly, SG-2 and SG-1B are permanently connected and treated as a single main switchboard. The other two main switchboards are 3G-3A and SG-1A.

Note that the possible configurations of these switchboards are determined by and also limited by the circuit breakers (shown as dotted connecting lines). For example, there is not a circuit breaker between the top left main circuit switchboard (SG-4 permanently connected with SG-3B) and the bottom right main switchboard SG-1A.

There are only four circuit breakers, denoted as Bit 1, Bit 2, Bit 3, and Bit 4. Each circuit breaker has two possible positions: short or open. These two positions may be expressed in binary logic as zero or one. Thus, with 4 circuit breakers there are 16 possible states, and these may be expressed in binary as 0000 through 1111.

Figure 2:
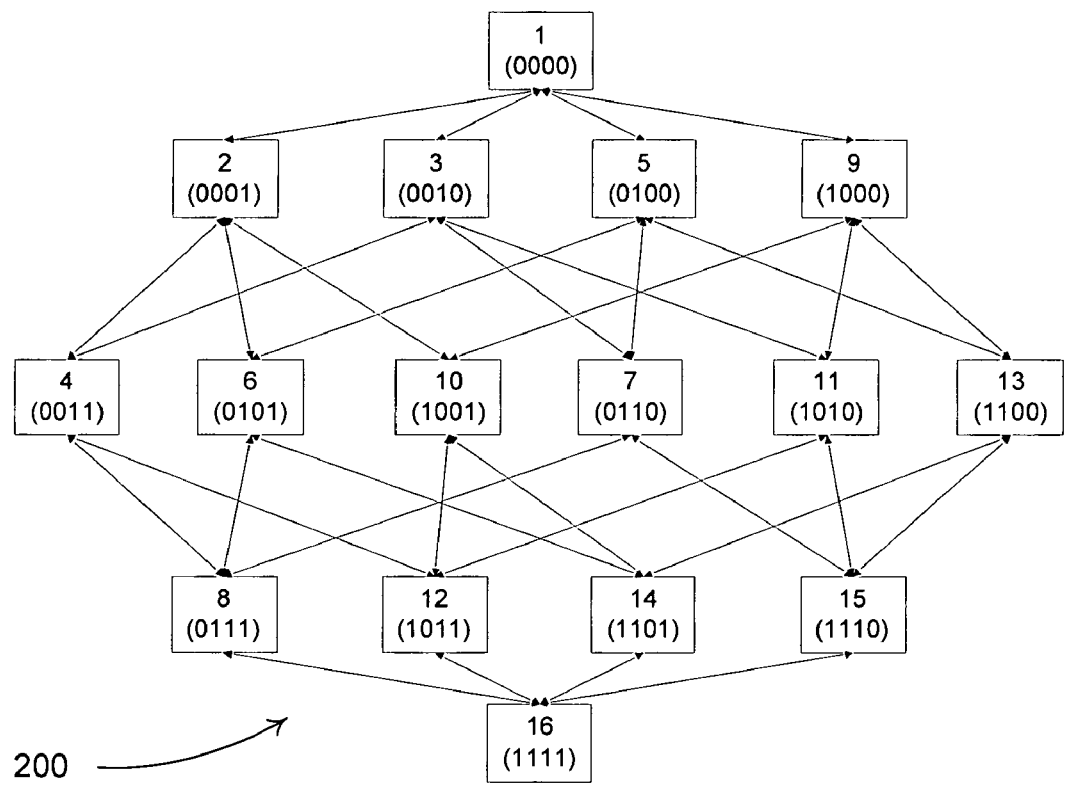
FIG. 2 displays a Network Representation of a Medium Voltage Distribution System.

FIG. 2 displays a Network Representation of a Medium Voltage Distribution System. As discussed above, a configuration of a medium voltage distribution system on a ship may be represented by n circuit breakers. These circuit breakers may connect various switchboards. Each circuit breaker has two positions (short or open).

Figure 3:
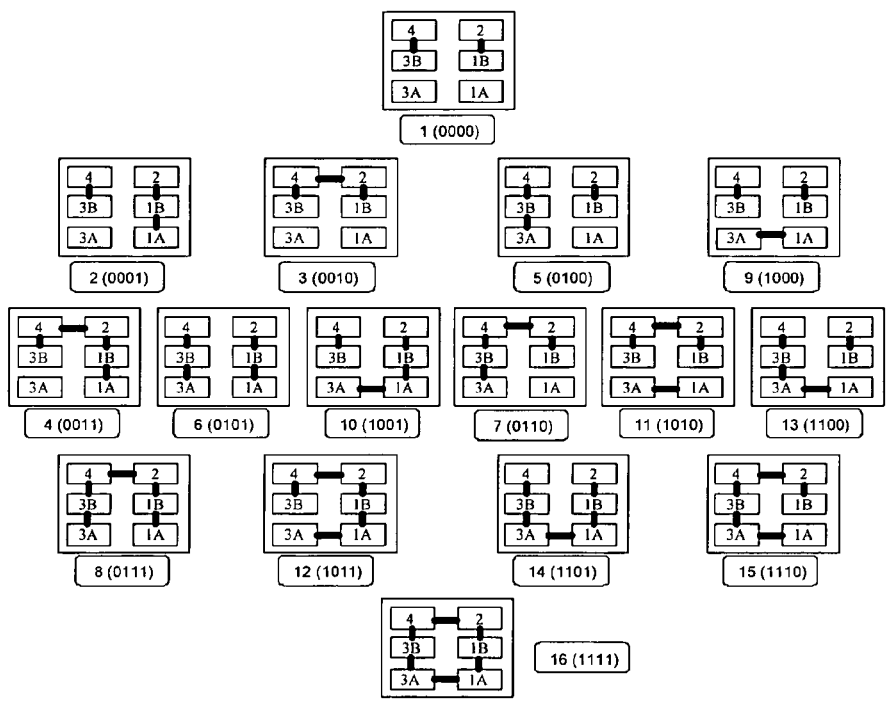
FIG. 3 displays Lineup States of a Medium Voltage Distribution System.

FIG. 3 displays Lineup States of a Medium Voltage Distribution System. All possible power distribution configurations among the swithboards are shown, corresponding to 16 possible states, and these may be expressed in binary as 0000 through 1111.

Figure 4:
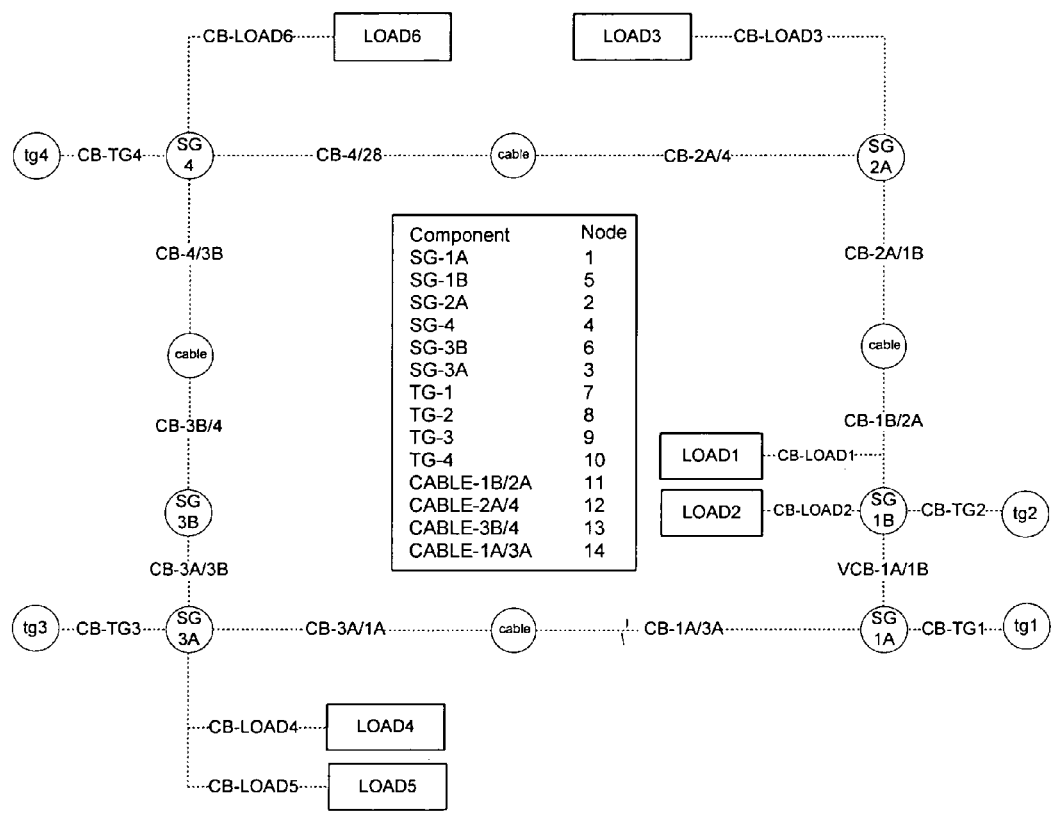
FIG. 4 displays a Medium Voltage Distribution System Architecture.

FIG. 4 displays a Medium Voltage Distribution System Architecture. This figure displays additional detail regarding the loads for a typical medium voltage distribution system.

SYSTEM NETWORK, STATES AND NODES. All possible combinations of these four bits can be used to generate a network of lineup states. The number of states, nStates, is directly related to the number of bits, nBits, used to represent the system, where nStates=$2^{nBits}$. Sixteen states exist in this four bit setup. These lineup states represent all considered configurations of the power distribution system. Each state is named by its decimal representation of the binary number plus one. For example, the binary form of State 1 (or node 1) is 0000 in binary, and State 10 is 1001 in binary ($1001_2+1=10_{10}$). In other words the binary names for the 16 states are 0000 through 1111 in binary. This binary terminology is very convenient for expressing states that are defined by binary factors such as two position switches or circuit breakers. Alternately the states or nodes may be numbered starting at zero (to match the binary representation of 0000), although that convention is not used in FIG. 2.

In this binary fashion, FIG. 2 shows a network representation of the switchboard configurations. The transitions are specified by the changing of a single bit. Therefore, where a single bit change will move the system into a new state, a transition exists. The transitions out of any state are equal to the number of bits used to characterize the system. There are nBits*$2^{nBits}$ transitions. For a four bit system, there will be four possible transitions out of every state, and there are 4*$2^4$=64 total possible transitions.

The back and forth transitions between two states are defined as two unique transitions. In other words, the transition from state 1 to state 2 is distinct from, and may have a different associated cost than the transition from state 2 to state 1.

The medium voltage distribution system network in FIG. 2 shows a single line with arrows at both ends for transitions between states. This simplification is made for visual clarity. These transitions may not necessarily require the same effort, and thus may not have the same associated cost. For example, a single line connects State 4 (0011) to State 8 (0111). The transition is effected by changing Bit 3. It is recognized that a cost difference may exist in bringing the bit from high to low versus low to high. Further, it is possible that some transitions between two states may be allowed in one direction, but not allowed (or infinite cost) in the reverse direction.

TRANSITION COSTS. Each transition should be assigned a relative cost. The cost of each transition could be dependent on several factors. The time required to effect a transition. The number of operations required to make the transition. Any OSD restrictions on the destination state could be added to the cost of all transitions into that state. The absolute cost value is not critical. It is critical that the cost reflect the effort of effecting a state transition relative to all other transitions.

The transition costs should be updated regularly to reflect the current system status. In some instances, it is necessary to close two breakers to effect a bit change. For example, the SG-3A to SG-1A connection requires closure of two circuit breakers. If either breaker is open, the bit representing the connection is low. The cost of the transition could be lowered to reflect a single breaker close is needed versus two breaker closes. The transition costs are a direct function of current component status. Since components are continually changing status, the transition costs should be updated regularly.

TRANSITION COST FUNCTION. The transition cost function should account for all the factors in making a transition and reflect their relative importance in the final cost. The factors should be identified and ranked from most to least important. There should be a logical condition and a value for each factor. The logical condition, if true, will cause the cost to increment higher by the value for that factor. The cost function will result in a final value that reflects the sum total of all the factors involved in making a transition. In other words, an objective function must be defined and optimized to find the lowest cost transition path.

DETERMINING A NEED TO EVALUATE. There are multiple ways to determine a need to evaluate and/or change the power distribution configuration. First, an external human decision could be made to trigger a search for an optimum configuration and for an associated optimum transition path. Second, a search could be made on periodic basis, for example once every hour, and/or once every 100 miles for a vehicle travels. Third, a search could be made in response to a change in OSD (operational scenario definition, or OPSIT) in a military system, for example entering or leaving a "red alert" or similar scenario. Also, note that the particular OSD may affect the cost functions themselves, so a change in OSD would be a logical time to search for an optimum configuration and an optimum transition path. Fourth, other specific conditions could be designated to trigger searches, for example, a major power producer (or a major power consumer) turning on or off could automatically trigger searches. Fifth, An interface may supply two bits of data: the status and the availability. For example, the circuit breaker can be open or closed and available or unavilable. When the status goes from closed to open, and availability goes from available to unavailable within a certain time period, this is viewed as a casualty and will trigger a search for an optimum configuration and for an associated optimum transition path. Sixth, some combination of the above, and/or other methods known in the art.

DETERMINING AN OPTIMUM POWER DISTRIBUTION CONFIGURATION. After determining a need to evaluate the power distribution configuration, then an optimum power distribution configuration (a target lineup) should be determined.

Table 1 displays an exemplary set of rules to define an power distribution configuration (or "target lineup") costs for a medium voltage power distribution system in a military ship. In Table 1, the "ID" column provides an arbitrary identification number to a rule, for convenience. In one preferred embodiment, at least 5 rules are used to define an optimum configuration.

The "Rule" column describes a situation that is not desirable. For example, Rule 4 states "Connects unpowered switchboards." It would be undesirable to target a state that connected unpowered switchboards. Thus, each undesirable condition is associated with a positive cost. And an optimum power distribution configuration will have a minimum cost.

The "Comments" for Rule 4 state "The system cannot be forced into a state that is prohibited by protection hardware." In other words, it is physically impossible to connect unpowered switchboards.

The "Scoring Function" for Rule 4 state "Either/Or {0,1}." In other words, the rule has a binary output. If the configuration connects unpowered switchboards, the scoring function is 1.

The "Relative Weight Factor" for Rule 4 is infinity. Thus, the cost for connecting unpowered inputs in Rule 4 is 1 times infinity, which equals infinity cost. In other words, "Scoring Function" times "Relative Weight Factor" equals configuration cost contributed by each rule. Infinite cost means that the configuration is not allowed. Thus, no state that connects unpowered switchboards can be an optimum power distribution configuration.

A different type of "Scoring Function" is illustrated by the scoring function of Rule 5, which states "Per Occurrence {0,1,2,3,4,5,6}." Rule 5 states "Contains a real unpowered switchboard". The "Relative Weight Factor" for rule 5 is 100,000x. Thus, a configuration with 3 unpowered switchboards would have a cost of 3 times 100,000x totaling 300,000x. Note that the "x" in "100,000x" may be any arbitrary unit.

After defining a power distribution configuration cost function, then all possible configurations are evaluated, and the lowest cost configuration is determined to be the optimum power distribution configuration, and is the target lineup.

In the simple example described in FIG. 2, with only 4 bits and 16 possible states, all 16 states may be evaluated. Each of the 16 states would be assigned a cost after evaluating all of the power distribution configuration cost rules for each state.

If there is a tie among two or more states for the minimum cost, then a selection may be made: by random choice, by some arbitrary selection rule, or by a "tie-breaker". A "tie-breaker" may comprise selecting the present state if the present state is involved in the tie, or may comprise selecting the state with the minimum associated transition costs.

Note that in complex systems it may be impossible or impractical to evaluate all possible states. In this situation, various optimization search techniques may be used to locate an approximately "optimum" state, even if this "optimum" state is not really the true optimum state for the system. These search techniques are well known.

TABLE 1

Power Distribution Configuration Costs (State Rules)

| ID | Rule | Comments | Scoring Function | Relative Weight Factor |
|----|------|----------|------------------|------------------------|
| 1 | Mixes real and virtual components (LBTS Only) | LBTS Only. A virtual load or TG cannot be connected to a switchboard with real loads or TG. | Either/Or {0, 1} | Inf |
| 2 | Requires unavailable component | States cannot be realized if they require a breaker that is a casualty or locked out. | Either/Or {0, 1} | Inf |
| 3 | Completes ring bus | A TG cannot be paralleled with itself. This recognizes hardware design considerations. | Either/Or {0, 1} | Inf |
| 4 | Connects unpowered switchboards | The system cannot be forced into a state that is prohibited by protection hardware. | Either/Or {0, 1} | Inf |
| 24 | Requires unavailable synchronization component | States cannot be realized if they require a sync operation that is a casualty or locked out. | Either/Or {0, 1} | Inf |
| 25 | MTG1 is not permitted when 2A/1B connected (LBTS Only) | States cannot be realized if they require a sync operation that is a casualty or locked out. | Either/Or {0, 1} | Inf |
| 5 | Contains a real, unpowered switchboard | These states are recognized to allow for startup and casualty situations | Per Occurrence {0, 1, 2, 3, 4, 5, 6} | 100,000x |
| 18 | Has ATG in parallel (LBTS Only) | Current EDM design does not permit operation of ATGs in parallel | Either/Or {0, 1} | 100,000x |
| 21 | Has MTGs in parallel (not LBTS) | Current ship design does not permit operation of MTGs in parallel | Either/Or {0, 1} | 100,000x |
| 6 | Has more present load than power generation capacity in a power center | It is not desirable to force the Power Manager to shed loads. | Sum of Power centers overload on a per unit basis (0-) | 10,000x |
| 11 | Has not aligned the plant to match load sizes proportional to | The loads fed by the switchboards should be aligned proportionately | Residuals of PP compared to AVP (pu) by power | 1,000x |

TABLE 1-continued

Power Distribution Configuration Costs (State Rules)

| ID | Rule | Comments | Scoring Function | Relative Weight Factor |
|---|---|---|---|---|
| | online generation capacity, excluding virtual loads | with the online generation capacity. | center (0-) | |
| 16 | Does not meet OPSIT Power Source Configuration, excluding Virtual Power Sources | Plant alignment should use the desired combination of power sources. Virtual power sources will not be counted. | Either/Or {0, 1} | 1,000x |
| 17 | Does not meet OPSIT Power Center Quantity, excluding Virtual Power Centers | Plant alignment should maintain the desired number of power centers. Virtual power centers will not be counted. | Absolute value of the Delta {0, 1, 2, 3} times {1 for positive Delta, 2 for negative Delta} | 1,000x |
| 9 | All machinery co-located, when ship is in a heightened readiness condition | Running co-located machinery is less desirable for survivability | Either/Or {0, 1} | 1,000x |
| 19 | Has more rated load than power generation capacity in a power center, and the ship is in a heightened readiness condition | When the ship is in heightened readiness, it is preferable to align the plant with the load ratings anticipating that the loads will increase above present levels. | Sum of Power centers overload on a per unit basis (0-) | 100x |
| 7 | Has all TGs in parallel | It is possible, but not desirable to parallel all TGs | Either/Or {0, 1} | 100x |
| 8 | Has a load's alternate feeders on a single power center, when Current OPSIT specifies more than one power center | Placing alternate feeders on separate power centers will improve redundancy. | Per Occurrence, per unit of total alternate loads {0, 1, 2, 3, . . . 6}/6 | 100x |
| 22 | Requires multiple steps to reach from the current state | Captures the difference between the target state and the current state | Per Occurrence, per unit of total number of differing system bits{0, 1, 2, 3, . . . 9}/9 | 100x |
| 10 | Requires machinery in multiple rooms, when ship is in a low readiness condition | Running machinery in separate rooms requires additional resources | Either/Or {0, 1} | 10x |
| 12 | Requires lower priority machines | Machines that have lower priorities should not be used before machines with higher priority | Per Occurrence {0, 1, 2, 3} | 10x |
| 20 | Has switchboards fed from remote power sources | It is more desirable for a switchboard to be close to its power source | # of breakers between SG and closest TG {0, 1, 2, 3, . . . 10} | 10x |
| 13 | Requires Multiple Real Machines | Additional machines require more resources | Per Occurrence {0, 1, 2, 3} | 1x |
| 23 | Token | If no rules are triggered, a token value is needed. | {1} | 1x |

DETERMINING AN OPTIMUM TRANSITION PATH. After determining a need to evaluate the power distribution configuration, and after an optimum power distribution configuration is determined, then an optimum transition path should be determined (to transition from the present state to the target state).

Table 2 displays an exemplary set of rules to define an optimum transition path for a medium voltage power distribution system in a military ship. Table 2 is similar to Table 1 above. Each rule defines undesirable transition characteristics, and each rule is associated with a cost. In one preferred embodiment, at least 5 rules are used to define an optimum transition path.

If it is feasible, all potential paths are evaluated and the path with the minimum cost is determined to be the optimum (least cost) path. Generally the systems will be so complex that it will not be feasible to evaluate all paths, therefore one of many well known optimization search techniques may be used.

TABLE 2

Power Distribution Transition Costs (Transition Rules)

| ID | Rule | Comments | Scoring Function | Relative Weight Factor |
|----|------|----------|------------------|------------------------|
| 1 | Enters an impossible state | As evaluated by the OPSIT States Rules | Either/Or {0, 1} | Inf |
| 2 | Requires a close and the close hardware is unavailable | It is not possible to make a transition that requires an unavailable component. | Either/Or {0, 1} | Inf |
| 3 | Requires a synchronization and the Synchronization hardware is unavailable | Sync availability will be determined by the hardware status. | Either/Or {0, 1} | Inf |
| 4 | Increases the number of real, unpowered boards | It is not desirable to have unpowered boards in the power plant operation | Either/Or {0, 1} | 100,000x |
| 5 | Changes a power source when a switchboard is unpowered | It is preferable to route power among the switchboards prior to adding sources. | Either/Or {0, 1} | 100,000x |
| 6 | Adds a power source that is not in the target state | It is not desirable to add & secure a power source only to aid a transition | Either/Or {0, 1} | 10,000x |
| 7 | Removes a power source that is in the target state | It is not desirable to add & secure a power source only to aid a transition | Either/Or {0, 1} | 10,000x |
| 11 | Does not maintain the required generation capacity | Transition path should maintain the online capacity that is the greater of starting state and target state for as long as possible. Rationale: greater power redundancy during plant alignment changes | Either/Or {0, 1} | 10,000x |
| 8 | Enters a state that does not meet the OPSIT power source configuration | Transitions should respect the guidelines of the operational situation | Absolute value of Delta less 0.5 {.5, 1.5, 2.5, 3.5} times {1-positive Delta, 2-Negative Delta} | 1,000x |
| 9 | Enters a state that does not meet the OPSIT number of power centers and moves further away from the OPSIT number of power centers | It is not desirable to have fewer power centers than required by the OPSIT | Absolute value of Delta {0, 1, 2, 3} times {1-positive Delta, 2-Negative Delta} | 1,000x |
| 10 | Enters a state with more present power than available power | States that require load shedding activity should be avoided. | Either/Or {0, 1} | 1,000x |
| 12 | Enters a state with co-located Machinery, and ship is in a heightened readiness condition | Running co-located machinery is less desirable for survivability | Either/Or {0, 1} | 100x |
| 13 | Reduces the number of power centers, and ship is in a heightened readiness | Fewer power centers reduce the power redundancy of the system | Either/Or {0, 1} | 100x |
| 14 | Enters a state with load's alternate feeders on the same power center | Placing alternate feeders on separate power centers will improve redundancy. | Per Occurrence, per unit of total alternate loads {0, 1, 2, 3, . . . 6}/6 | 100x |
| 15 | Requires a synchronization | Synchronizations carry additional effort in a state transition | Either/Or {0, 1} | 10x |
| 16 | Requires a zero-power transfer | Zero-power transfers carry additional effort in a state transition | Either/Or {0, 1} | 10x |
| 19 | Shuts a breaker | This rule assigns more effort to shut breakers than to open breakers. | Either/Or {0, 1} | 1x |
| 20 | Token Value | If no rules are triggered, a token value for the transition is needed. | {1} | 1x |

IMPLEMENTING AN OPTIMAL TRANSITION PATH TO AN OPTIMAL CONFIGURATION. After determining an optimal transition path to an optimal configuration, this transition may be implemented automatically. Alternately, the optimal transition path to an optimal configuration may be suggested to a human for consideration, but not implemented unless human approval is received. Alternately, the optimal transition path to an optimal configuration may be presented to a human for consideration, and may be implemented automatically after a reasonable delay unless a human veto is received.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from the spirit or essential attributes.

What is claimed is:

1. A method for configuring a power distribution system configuration, comprising:
    determining an optimal power distribution system configuration by using a set of power distribution configuration cost rules;
    determining an optimal transition path to transition from a present configuration to said optimal power distribution system configuration by using a set of power distribution transition cost rules; and
    implementing said optimal transition path to reach said optimal power distribution system configuration.

2. The method of claim 1, wherein said configuring a power distribution system configuration is performed regularly in a periodic fashion, and wherein the period is defined as a time that has elapsed or is defined as a distance that a vehicle has traveled.

3. The method of claim 1, wherein said configuring a power distribution system configuration is performed after an operational situation status has changed.

4. The method of claim 1, wherein said configuring a power distribution system configuration is performed after a change in the status of at least one circuit breaker, or after a change in the availability of at least one circuit breaker.

5. The method of claim 1, wherein determining an optimal power distribution system configuration comprises using the power distribution configuration cost rules to determine a cost for all possible configurations.

6. The method of claim 1, wherein determining an optimal power distribution system configuration comprises using the power distribution configuration cost rules to determine a cost for at least two power distribution system configurations, and wherein a tie breaking rule is implemented if multiple configurations have an identical minimum cost, and wherein the tie breaking rule is to chose a present configuration when the present configuration has the identical minimum cost.

7. The method of claim 1, wherein determining an optimal power distribution system configuration comprises using the power distribution configuration cost rules to determine a cost for at least two power distribution system configurations, and wherein a tie breaking rule is implemented if multiple configurations have an identical minimum cost, and wherein the tie breaking rule is to determine an optimal transition path to each of said multiple configurations and to select the configuration associated with the lowest optimal transition path cost.

8. The method of claim 1, wherein determining an optimal power distribution system configuration comprises using the power distribution configuration cost rules to determine a cost for at least two power distribution system configurations, and wherein the power distribution configuration cost rules comprise: (a) whether unpowered switchboards are connected, and (b) whether an unpowered switchboard is contained, and (c) whether a power center has more present load than power generation capacity, and (d) whether any switchboards are fed from remote power sources.

9. The method of claim 1, wherein the power distribution transition cost rules comprise: (a) whether there is an increase in the number of real, unpowered boards, and (b) whether a power source is changed when a switchboard is unpowered, and (c) whether a power source that is in the optimal power distribution system configuration is removed.

10. The method of claim 1, wherein the action of implementing said optimal transition path is performed automatically.

11. The method of claim 1, wherein implementing said optimal transition path to reach said optimal power distribution system configuration comprises sending the optimal transition path and the optimal power distribution system configuration to a human for agreement, receiving agreement from the human, and implementing the optimal transition path after receiving agreement.

12. The method of claim 1, wherein implementing said optimal transition path to reach said optimal power distribution system configuration comprises: (a) sending the optimal transition path and the optimal power distribution system configuration to a human for a veto, and (b) waiting a fixed period of time, and (c) not receiving the veto during the fixed period of time, and (d) implementing said optimal transition path to reach said optimal power distribution system configuration.

13. The method of claim 1, wherein:
    determining an optimal power distribution system configuration comprises using the power distribution configuration cost rules, to determine a cost for at least two power distribution system configurations, and wherein the power distribution configuration cost rules comprise: (a) whether unpowered switchboards are connected, and (b) whether an unpowered switchboard is contained, and (c) whether a power center has more present load than power generation capacity, and (d) whether any switchboards are fed from remote power sources; and
    the power distribution transition cost rules comprise; (a) whether there is an increase in the number of real, unpowered boards, and (b) whether a power source is changed when a switchboard is unpowered, and (c) whether a power source that is in the optimal power distribution system configuration is removed.

14. A system for configuring a power distribution system configuration, comprising:
    an optimal configuration module adapted to determine an optimal power distribution system configuration; and
    an optimal transition path module adapted to determine an optimal transition path from a present configuration to said optimal power distribution system configuration by using power distribution transition cost rules.

15. The system of claim 14, wherein said optimal configuration module is adapted to determine an optimal power distribution system configuration based upon a set of power distribution configuration cost rules, and wherein the power distribution configuration cost rules comprise: (a) whether unpowered switchboards are connected, and (b) whether an unpowered switchboard is contained, and (c) whether a power enter has more present load than power generation capacity, and (d) whether any switchboards are fed from remote power sources.

16. The system of claim 14, wherein the optimal transition path module is adapted to determine an optimal transition path b&ed upon a set of power distribution transition cost rules, and wherein the transition path cost rules comprise: (a) whether there is an increase in the number of real, unpowered boards, and (h) whether a power source is changed when a switchboard is unpowered, and (c) whether a power source that is in the optimal power distribution system configuration is removed.

17. The system of claim 14, wherein:
    said optimal configuration module is adapted to determine an optimal power distribution system configuration based upon set of power distribution configuration cost rules, and wherein the power distribution configuration cost rules comprise: (a) whether unpowered switchboards are connected, and (b) whether an unpowered switchboard is contained, and (c) whether a power center has more present load than power generation capacity, and (d) whether any switchboards are fed from remote power sources; and
    said optimal transition path module is adapted to determine an optimal transition path based upon a set of power distribution transition cost rules, and wherein the power distribution transition cost rules comprise: (a) whether there is an increase in the number of real, unpowered boards, and (b) whether a power source is changed when a switchboard is unpowered, and (c) whether a power source that is in the optimal power distribution system configuration is removed.

18. A computer readable medium, comprising instructions which when executed will cause the following steps to be performed:
    determining an optimal power distribution system configuration by using a set of power distribution configuration cost rules; and
    determining an optimal transition path to transition from a present configuration to said optimal power distribution system configuration by using a set of power distribution transition cost rules.

19. The computer readable medium of claim 18, wherein the power distribution configuration cost rules comprise: (a) whether unpowered switchboards are connected, and (b) whether an unpowered switchboard is contained, and (c) whether a power center has more present load than power generation capacity, and (d) whether any switchboards are fed from remote power sources.

20. The computer readable medium of claim 18, wherein the power distribution transition cost rules comprise: (a) whether there is an increase in the number of real, unpowered boards, and (b) whether a power source is changed when a switchboard is unpowered, and (c) whether a power source that is in the optimal power distribution system configuration is removed.

21. The computer readable medium of claim 18, wherein the power distribution configuration cost rules comprise:
    (a) whether unpowered switchboards are connected, and (b) whether an unpowered switchboard is contained, and (c) whether a power center has more present load than power generation capacity, and (d) whether any switchboards are fed from remote power sources; and
    the power distribution transition cost rules comprise: (a) whether there is an increase in the number of real, unpowered boards, and (b) whether a power source is changed when a switchboard is unpowered, and (c) whether a power source that is in the optimal power distribution system configuration is removed.

22. A method for configuring a power distribution system configuration, comprising:
    selecting an operator selected power distribution system configuration;
    determining an optimal transition path to transition from a present configuration to said operator selected power distribution system configuration, wherein determining said optimal transition path comprises using a set of power distribution transition cost rules, and wherein the power distribution transition cost rules comprise: (a) whether there is an increase in the number of real, unpowered boards and (b) whether a power source is changed when a switchboard is unpowered, and (c) whether a power source that is in the operator selected power distribution system configuration is removed; and
    implementing said optimal transition path to reach said operator selected power distribution system configuration.

\* \* \* \* \*

UNITED STATES PATENT AND TRADEMARK OFFICE
CERTIFICATE OF CORRECTION

| | | |
|---|---|---|
| PATENT NO. | : 7,369,921 B2 | |
| APPLICATION NO. | : 11/351550 | |
| DATED | : May 6, 2008 | |
| INVENTOR(S) | : Taliaferro | |

It is certified that error appears in the above-identified patent and that said Letters Patent is hereby corrected as shown below:

<u>Column 15,</u>

Line 13, "b&ed" should read --based--.

Signed and Sealed this

Fifth Day of August, 2008

JON W. DUDAS
*Director of the United States Patent and Trademark Office*